United States Patent
Moss et al.

[11] Patent Number: 6,144,011
[45] Date of Patent: Nov. 7, 2000

[54] LASER MARKING APPARATUS AND METHODS

[75] Inventors: John Moss, Vale of Glamorgan; Simon Lau, Porthcawl; David Keston Phillips, Swansea, all of United Kingdom

[73] Assignee: Spectrum Technologies Limited, South Wales, United Kingdom

[21] Appl. No.: 09/125,689

[22] PCT Filed: Feb. 24, 1997

[86] PCT No.: PCT/GB97/00497

§ 371 Date: Aug. 24, 1998

§ 102(e) Date: Aug. 24, 1998

[87] PCT Pub. No.: WO97/31324

PCT Pub. Date: Aug. 28, 1997

[30]  Foreign Application Priority Data

Feb. 23, 1996 [GB]  United Kingdom ................... 9603868

[51] Int. Cl.[7] ................................................. B23K 26/36
[52] U.S. Cl. ................................ 219/121.68; 219/121.69
[58] Field of Search ........................ 219/121.68, 121.69, 219/121.73, 121.75; 347/224, 247, 258

[56]  References Cited

U.S. PATENT DOCUMENTS

| | | |
|---|---|---|
| 4,194,814 | 3/1980 | Fischer et al. ........................... 347/258 |
| 4,401,992 | 8/1983 | Vorst et al. . |
| 4,578,329 | 3/1986 | Holsappel ........................... 219/121.69 |
| 4,626,656 | 12/1986 | Ootsuka et al. ................... 219/121.69 |
| 4,803,336 | 2/1989 | Myer ................................ 219/121.68 |
| 5,149,938 | 9/1992 | Winston et al. ................... 219/121.68 |
| 5,231,263 | 7/1993 | Kuwabara et al. ................ 219/121.68 |
| 5,719,372 | 2/1998 | Togari et al. ...................... 219/121.68 |
| 5,928,842 | 7/1999 | Shinmoto et al. ...................... 430/346 |

FOREIGN PATENT DOCUMENTS

| | | |
|---|---|---|
| 60-121091 | 6/1985 | Japan . |
| 61-134724 | 6/1986 | Japan . |
| 64-15298 | 1/1989 | Japan ................................ 219/121.73 |
| 2-11283 | 1/1990 | Japan . |
| 4-200886 | 7/1992 | Japan . |
| 8-1366 | 1/1996 | Japan . |

*Primary Examiner*—Geoffrey S. Evans
*Attorney, Agent, or Firm*—Young & Thompson

[57]  ABSTRACT

A method and apparatus for laser marking a moving workpiece such as a wire or cable directs a substantially constant rapidly pulsed laser beam at a frequency of at least 15 Hz towards a low inertia, low mass rotatable mask with character apertures disposed around its periphery. The mask is driven asynchronously to present successive characters with each pulse to form a composite image.

18 Claims, 4 Drawing Sheets

Graph for 25 character jump

LASER MARKING APPARATUS AND METHODS

This invention relates to laser marking apparatus and methods and in particular, but not exclusively, the invention is concerned with marking a series of marks or characters on an elongate and/or moving object, such as a wire, cable or tube, or on a series of objects.

Manufacturers of products containing a large number of electrical wires or cables, or other elongate elements such as pipes or tubes, are often obliged to mark them with identification codes for production, maintenance and safety reasons. This is particularly so in the aerospace industry where the outer insulation of wires must be marked at regular intervals along their length (typically every 75 mm). Historically, this has been achieved using hot stamp, ink jet and, more recently, laser technologies. The word "wire" is used to include the electrical conductor, and any insulation or shielding.

For the last several years, ultra violet (U.V.) laser wire markers have been available based on a specific type of pulsed U.V. laser known as an "Excimer" laser which generally induces a colour change in Titanium Dioxide, which is contained as a pigment in many plastics materials used as insulation. These U.V. laser wire markers are quickly becoming the preferred solution in higher volume manufacturing situations because of their speed of operation and particularly because they produce high quality permanent marks on the most advanced, "non-stick", thin-walled fluoropolymer finished wires and cables without damaging or affecting the integrity of the insulation.

In a typical arrangement, radiation from an excimer laser which can be fired on demand is used to illuminate alphanumeric characters on a continuously rotating mask. The laser, being capable of asynchronous operation, is slaved to the mask and fired when the selected character or the mask is in the path of the laser beam. De-magnified images of the mask characters are created on the surface of the wires thereby producing wire or cable identification marks. To allow for the fact that the laser does not fire at regular intervals when a series of characters is printed, a galvanometer mirror is positioned to provide a variable deflection to ensure constant character spacing and to increase effective throughput. This system gives excellent results and has achieved substantial commercial success with major aerospace manufacturers, but the system is sophisticated and the purchase and running costs reflect this. Excimer lasers are large, expensive, use toxic gases to produce the laser radiation and require special services. Thus the site for the laser marking machine requires water or air cooling services, an extraction system, a source of compressed air, a supply of several gases, and a suitable power supply. However, against this these systems do have the advantage that the laser is slaved to the mask and so the mask is only required to rotate at a constant speed.

Naturally, in any machine, particularly those without galvanometers, the wire marking speed is extremely important because this dictates the productivity of the machine, with a typical throughput for marking applications needing a laser firing at 20 Hz. Any slower than this would mean that the throughput rate of wire was unacceptably low. Existing machines using fire-on-demand lasers employ a variety of techniques to maximise this speed, including sweeping the beam to track the wire during printing. To cater for a variety of sizes of wire, and customer requirements, the rotating mask usually needs to carry several print sizes and also to present characters in both vertical and horizontal orientations, and so the mask may carry three or more character sets around its periphery, which in turn dictates the diameter and inertia of the mask.

A need exists for a laser marking machine of simpler construction for lower volume manufacturing and maintenance operations and which does not place such high demands in terms of the services required at the site.

In our first proposal, we investigated the possibility of a marking system which used a pulsed solid state laser instead of an excimer laser. Pulsed solid state lasers have the advantages of lower cost than excimer lasers and minimal service requirements but their mode of operation is synchronous, meaning that the rotatable mask must be slaved to the laser, requiring the mask to be rotated in different directions and at different speeds. However, this appeared to present insuperable problems in terms of moving the mask quickly and accurately enough to be ready for the next laser pulse. Given a typical existing rotary mask and the capabilities of typically available stepper motors it appeared that the best that could be achieved was a cycle of 80 ms for a half rotation of the mask which, allowing for settling, would mean that a marking speed of little more than 10 Hz would be possible, which would be unacceptable for many purposes.

However, we have found that, by redesigning the mask, special control of the motor, and optional optical transformation means for optically transforming the mask characters to reduce the number of characters on the mask and thus its diameter, mass and inertia, it is possible to provide a laser marking system which provides marking rates of 20 Hz or more.

Accordingly, in one aspect of this invention, there is provided a laser marking apparatus comprising:

a source of pulsed laser radiation for producing a beam of radiation, a rotatable mask for being illuminated by said radiation beam and including a plurality of character apertures spaced angularly around the axis of rotation thereof, and drive means for rotating said rotatable mask, wherein said drive means is operable intermittently to index said rotatable mask successively to align selected character apertures with said laser beam.

In embodiments of apparatus of this aspect of the invention, a rotatable mask is driven discretely to interpose the required character apertures in the radiation beam. Although the laser source could comprise any suitable laser source, the invention has been made with particular reference to a pulsed, solid state type of laser, e.g. an Nd:YAG laser, which is pumped by a flash lamp or the like to provide pulses of laser radiation at a substantially constant pulse rate. The pulse rate is preferably at least 15 Hz and more preferably 20 Hz or more. The use of the term 'pulsed' refers to repeated energisation of the lasing medium to provide the appropriate thermal environment; it does not require that the laser source necessarily emit radiation at each pulse. For example if a "blank" output pulse was required the laser shutter may be kept closed for the duration of the pulse.

In a preferred embodiment, the laser source includes one or more frequency multipliers to provide an output beam in the U.V. waveband of wavelength from 200 nm to 400 nm to create a marking fluence of between about 50 mJcm$^{-2}$ and about 2000 mJcm$^{-2}$. The frequency multiplying means preferably multiplies the frequency by a multiple of three, although other multiples are possible.

The drive means preferably comprises a stepper motor and control means for providing a selected drive input profile to said stepper motor to move the mask between successive angular positions. The input profile preferably includes an acceleration phase, a substantially steady speed phase, a deceleration phase and a settling phase, selected with regard to the physical characteristics of the mask, the response characteristics of the stepper motor, and the pulse rate of the laser, to ensure that the mask is ready with the correct character aperture in the beam path when the next pulse is generated.

The drive means preferably includes means for storing, for each increment of angular movement of said mask, a respective drive profile for being applied to said stepper motor. In this way, the speed of what may be termed the pulse profile is matched to the mask and motor characteristics. The acceleration and deceleration speeds and durations for each possible "jump" between characters may be stored for each jump from a single character to a 180° jump (e.g. 25 characters). The stepper motor may be driven in either direction and the profile for a clockwise jump may be the same as that for an anticlockwise jump.

The stepper motor is preferably a rare earth magnetic stepper motor with the coils driven in parallel.

Although the mask may carry various character sets, it is preferred to reduce or minimise the inertia of the mask by including only one character set on the mask. Whilst the mask inertia should be kept as low as possible, the mask should have sufficient material to ensure that it is not subject to excessive transient movement when rapidly decelerated or ablated around the character apertures by the laser beam. A typical example of a mask is made of thin (about 0.08 mm) stainless steel material, and of diameter around 67 mm, although different dimensions will of course apply for different numbers of characters in the set, different materials etc.

Normally, the provision of just one character set on the mask would not be commercially acceptable because users wish to have fonts of different sizes, and of vertical and horizontal orientations, to provide suitable marking on wires or tubes of different diameters.

The apparatus therefore preferably includes optical transformation means in the beam path beyond the mask, operable to select the size and/or orientation of a character at the marking plane. The optical transformation means may include one or more lens means of selected optical power which may be moved into the beam to adjust the size of the image. It may also include one or more mapping means, for example prisms, which may be moved into the beam to present the character in a vertical, horizontal or other orientations. The mapping means preferably comprises two dove prisms to present the characters in the vertical and the horizontal orientation respectively.

By the use of the optical transformation means, the system may provide an extended character range whilst employing a mask of very low mass and inertia. For example, the mass of a mask used in embodiments of this invention, excluding the rotary hub, may be well under 5 gms and typically 2 gms or less and ideally less than 1.5 gm. This compares with a mask mass of 35.2 gm for an existing excimer laser wire marker. In one embodiment, the optical transformation means can apply four different combinations of size and orientation, thus providing four usable character sets (each of 50 characters) from the one on the mask, and a total character count of 200. The mass per usable character may therefore be as low as 6.5 mg, compared to about 294 mg for a conventional mask. The mass reduction ratio for the mask foil is therefore about 45:1 and the inertia reduction about 237:1.

The apparatus preferably includes means for advancing the wire or cable to be marked through the apparatus. This function may he achieved in a variety of ways in the apparatus itself or upstream/downstream thereof. For greater throughput, the means for advancing is preferably controllable to allow the wire or tube speed between identification marks to be increased.

In another aspect, this invention provides a laser marking method which comprises marking a series of characters on a workpiece by means of a beam of laser radiation which is pulsed at a generally constant pulse rate and a rotatable mask carrying a set of mask character apertures thereon, wherein the mask is indexed discretely to align successive character apertures with the laser beam.

In a further aspect of this invention, we have developed a laser marking or machining system which does not rely either on a mask imaging technique or a scanning spot technique. The mask imaging technique has been discussed above. In the latter technique, a laser beam is controlled by one or more galvanometer mirrors to write or draw on a target surface, e.g. X-Y fashion or as a raster scan.

Neither technique can be claimed to be predominantly employed over the other as each has its own benefits, restrictions or limitations. Mask imaging has the benefits of requiring only one laser shot per character and generates a real image of the mask, with detail limited by the projection optics and mask fabrication. It requires only medium repetition rate lasers to provide accepted production rates. However, requiring a solid mask means mask changeover or mark flexibility is restrictive and/or slow. Because of this, commercial marking systems have fixed, limited character set capabilities.

Notwithstanding the quality of the mark, the performance of laser marking machines is measured on wire throughput—the amount of wire which can be processed in a given time. Throughput can be considered to be inversely proportional to two simple variables—the laser charge time (Tc) between shots and the mask changeover time, or mask latency (Tm). On state-of-the-art excimer laser wire markers Tc is of the order of 5 ms and Tm is of the order of 3 ms producing an undesirable delay of 8 ms between shots or marks on the wire. Certain steps may be employed to slightly reduce this delay but the total delay is not reduced significantly.

The 3 ms mask access time may be reduced by decreasing the mask size or by reducing the number of available characters or character sets. Unfortunately, current trends require an expanded character set meaning a larger mask and therefore increasing the mask access time. It is not possible to simply increase rotational mask speed as the delicate mask cannot sustain the high centrifugal forces.

The 5 ms laser charge time is state-of-the-art for U.V. wire marking lasers and a large decrease in Tc is not anticipated in the near future.

On the other hand, scanning mirror-type markers require high repetition rate lasers to achieve industrial marking requirements. The laser spot is a fixed size which can limit resolution and hence character detail, but most restrictive is the speed and precision of control. In most instances scanning systems will be chosen over mask-based systems where requirements demand flexibility of control to generate a limitless character set, and the ability to mark or machine over large target areas.

We have developed a laser marking or machining apparatus designed to obviate at least some of the above problems.

Accordingly, in another aspect of this invention, this invention provides a laser marking or machining apparatus, comprising a source of laser radiation for producing a beam of radiation, and spatial light modulator means for modulating said beam to produce an image at the marking or machining plane.

In this apparatus, the image may be created by a solid state modulator thus avoiding the constraints posed by a rotating mask or a scanning mirror.

The spatial light modulator may take many forms but a preferred form of modulator is the digital micromirror device (DMD), examples of which are produced by Texas Instruments Inc. These devices are described in "Micromirrors and Digital Processing: Bringing a New Look to Displays": G. A. Feather, Photonics Spectra, May 1995, pp118–124, the contents of which are incorporated herein by reference.

The spatial light modulator preferably comprises an array of individually addressable pixels together making up the image formed or exposed at the marking or machining plane. In a typical example of such an array there may be 864×576 pixels making up nearly 500,000 in an area of 100 mm$^2$. Since the mask "changeover mechanism" employs switching of pixels rather than mechanical movement, extremely fast mask access times are possible with spatial light modulator micromirrors. For example, digital micromirror devices switch in approximately 10 μs, thus improving changeover by a factor of 300. Since each micromirror is individually controllable, this presents a considerably increased character set, which is a vast improvement from the typical set of 50 characters of current state-of-the-art markers.

The impact of speed capability from using micromirrors is easily appreciated but the flexibility of the character set is also a substantial benefit. Wires used in the aerospace industry are of a continuous diameter range, with specifications for marking usually insisting on an approximate 80% fill factor (character size to wire diameter). On the smallest wires print font may be switched from horizontal to vertical to maintain a standard 4:3 height:width aspect ratio thus ensuring optimum legibility even on small gauge wires. With fixed metal mask systems it is prohibitively costly to provide a continuum of available print sizes to match this wide range of wire diameters. However, with the considerable flexibility of a programmable array of light modulation pixels, for example 500,000 micromirrors, the 80% fill factor should be achievable in all current and future anticipated wire sizes with horizontal or vertical or italic fonts equally achievable and accessible.

In this latter respect, aerospace manufacturers have noted the importance of distinguishing those marks applied during manufacture of the wire from those functional identifying marks applied later by the customer. This is currently done by the inkjet/laser mark differential but will almost certainly require another distinguishing feature as laser marks replace inkjet marks for wire manufacture codes.

Spatial light modulators or micromirrors will also enable slight modifications of letter positions such as superscripts or subscripts but this lateral displacement capability will also be of great use for providing an electronic rather than mechanical method of precisely centering the identifying marks in the centre of the wire.

In another aspect, this invention provides adjustment of the image written by said modulator to compensate for movement of the item to be marked or machined relative to the marking or machining plane.

Finally, the use of spatial light modulators provides one very important further capability, namely printing machine readable codes.

In quality driven environments such as aviation wire marking there is a definite move from human readable alphanumerics to machine readable codes. Existing industrial standards are being adopted, but are not suitable for wires, or in general small parts. For example, Bar Code 39 is a linear bar code which when currently generated by a laser marker requires a particularly slow speed because of the spatial precision and density of information requiring several, e.g. 5, shots per character. The result is a long code which, on a wire or on a small part requires a large space which may not be available. This presents problems when attempting to read the code back because of twisting and alignment accuracy. We believe that there is a requirement for a high resolution code with a higher density, thereby occupying a smaller area.

Spatial light modulators, and in particular DMDs can be programmed to form a two dimensional dot matrix code which would mean, in a single laser shot, a substantial amount of machine readable code could be marked in an extremely small area. Linear spatial accuracy could be eliminated or reduced as a problem. Wire throughputs would undergo a phenomenal increase over alphanumeric code printing which are themselves orders faster than bar code printing. And with half a million individual mirror pixels addressable provides enough information content for most coding requirements. With reading back codes, twisting of wires would be of reduced importance as an information block is a single matrix entity rather that an elongated message.

Accordingly, in a further aspect of this invention there is provided a method of marking a component, which comprises passing a beam of laser radiation to a spatial light modulator and thence to said component, and composing on said spatial light modulator an intermediate image comprising a block or patch comprising a plurality of characters or marks. Thus, the modulator beam will mark the wire with said block or patch.

Whilst the invention has been described above, it extends to any inventive features set out above or in the following description.

Two embodiments of the invention will now be described by way of example only, reference being made to the accompanying drawings, in which.

Figure 1:
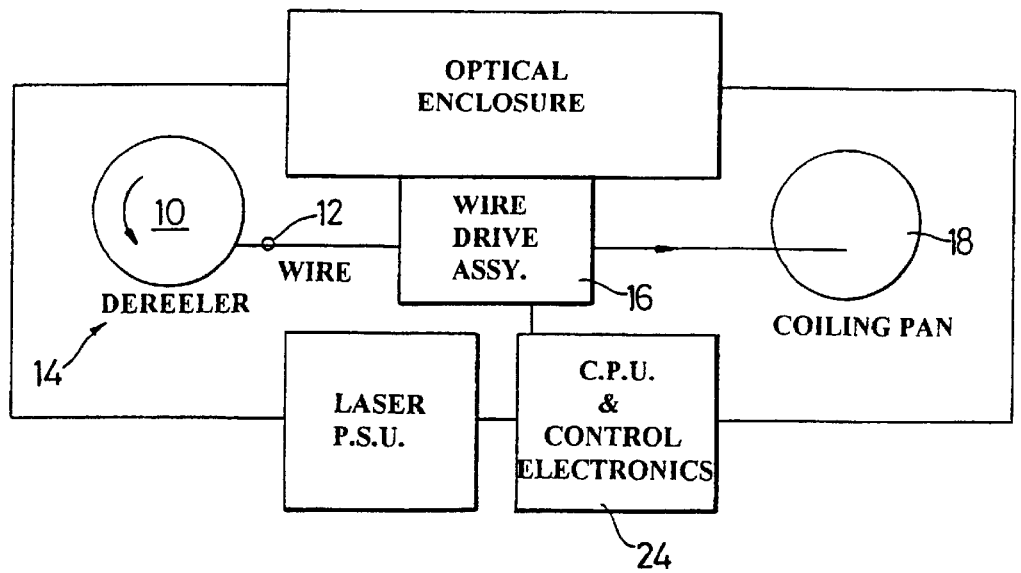
FIG. 1 is a block diagram of a wire marking system in accordance with this invention.

Referring initially to FIG. 1, both embodiments described below employ similar wire handling schemes. A drum 10 containing the wire 12 to be marked is positioned on the dereeler 14 and the wire fed through the wire drive assembly 16 to the coiling pan 18. The wire drive assembly 16 includes a tractor drive mechanism 20 powered by a stepper motor 22 through a gearbox (not shown). The wire throughput rate varies depending upon the required intercharacter spacing and the space between identification marks. The system is controlled by an IBM Compatible PC 24 using simple menu driven software. A solid state Nd:YAG laser 26 is pumped to emit pulses at a generally fixed repetition rate f (typically f=20 Hz for the illustrated embodiments). Each character must be placed in the path of the laser beam in a time significantly less that 1/f. In order to achieve this two different embodiments are proposed.

Figure 2:
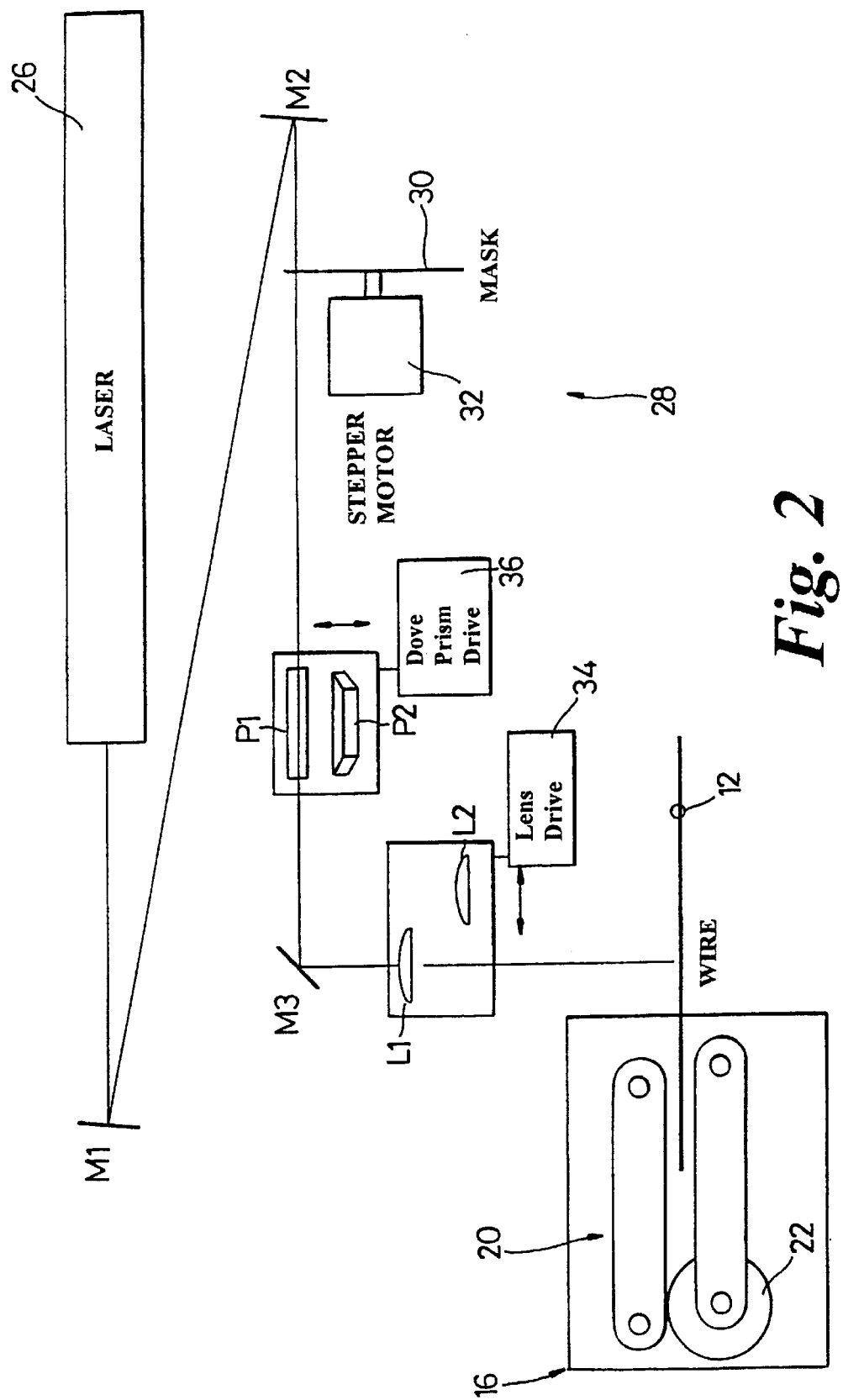
FIG. 2 is a schematic diagram showing the optical configuration of a first embodiment of laser marking system.
Figure 3:
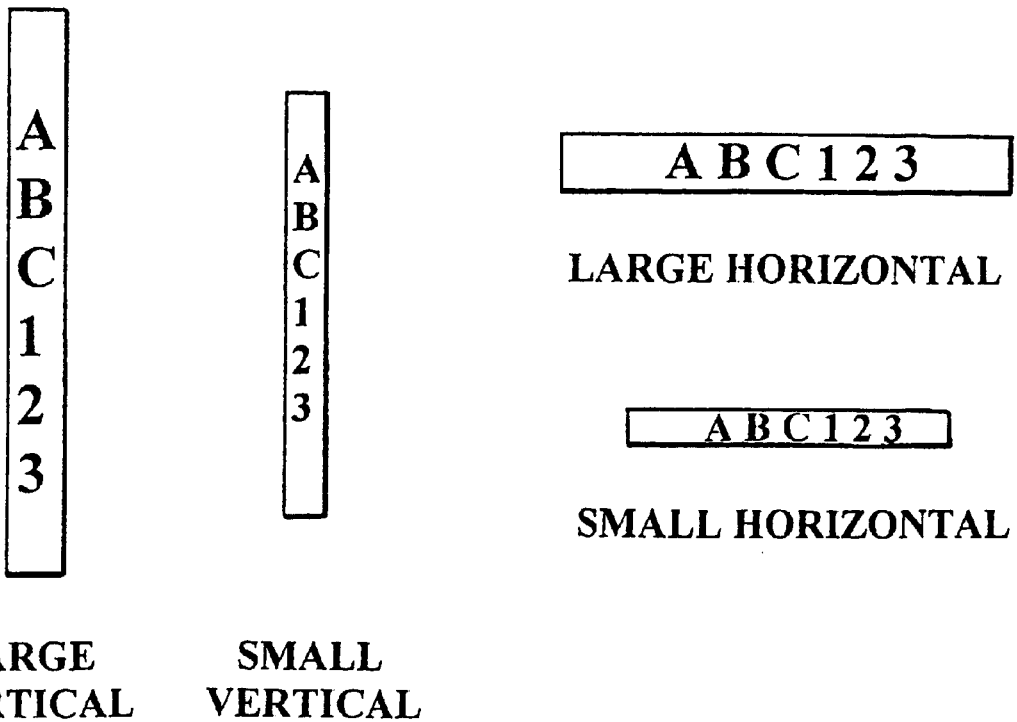
FIG. 3 illustrates the four character sets available from the embodiment of FIG. 2.

The configuration of the marking system of the first embodiment is shown in FIG. 2. The output beam from the laser 26 is directed via mirrors M1 and M2 to a mask assembly indicated generally at 28. Here the beam is truncated by a mask aperture (not shown) to remove unwanted radiation from the beam and to allow the remainder to efficiently illuminate the mask characters (or apertures). The beam then passes through one of two prisms (P1 or P2), which rotates the image of the mask character through 90° or 180° as required. A lens (L1 or L2) is used to form an image of the mask character on the wire surface. Combinations of these lenses and prisms enable two different font sizes and vertical and horizontal orientations to be marked, as illustrated in FIG. 3.

The mask assembly 28 comprises a rotatable stainless steel disk mask 30 which contains just one set of 50 alphanumeric characters (A . . . Z, 0 . . . 9, and a selection of symbols). A stepper motor 32 is used to move the mask 30 between laser pulses to position each character aperture in place before the next laser pulse arrives. In order to achieve this, a high speed stepper motor, and a special drive system is used, and the inertia of the mask minimised. The stepper motor 32 is a high power unit using rare earth magnets and having its coils driven in parallel, with 100 steps producing the full 360° rotation. An example of a suitable motor is an ESCAP (RTM) motor reference P532-258 004 available from McLennan Servo Supplies, Yorktown Industrial Estate, Camberley, Surrey, UK.

Figure 4:
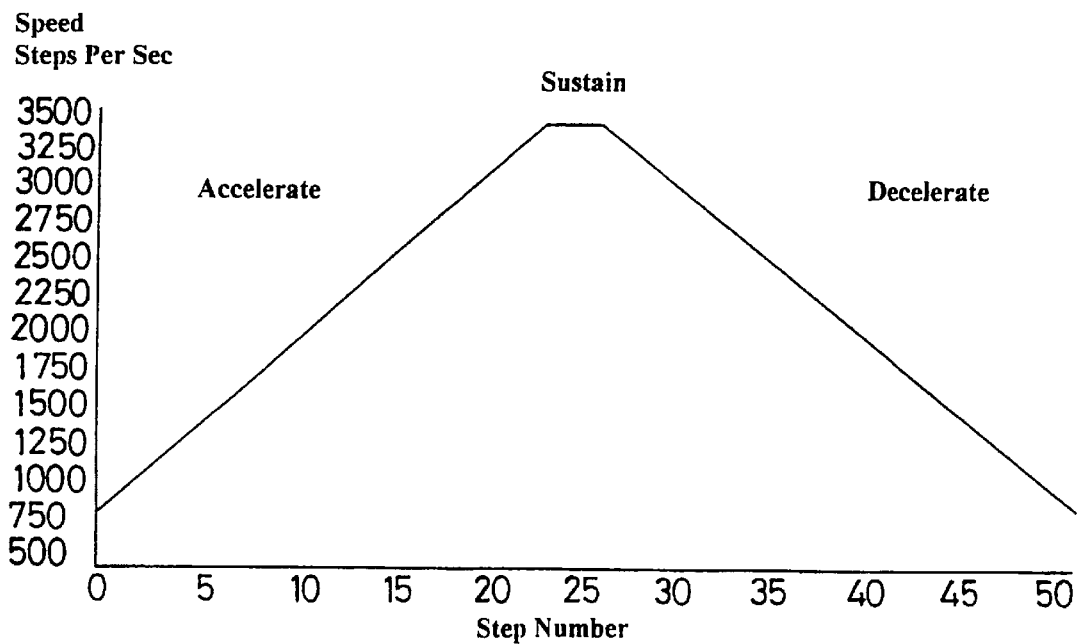
FIG. 4 is a diagram showing a typical accelerate/sustain/decelerate phase for one of the increments of jumps of the mask stepper motor used in the apparatus of FIGS. 1 and 2.

The computer 24 and its interface card(s) generate a series of pulses which drive the mask stepper motor 28. The frequency of these pulses is dynamically varied throughout a 'jump' from one mask character to another to achieve a fixed movement within the required timeframe. The acceleration and deceleration for each 'jump' on the mask from one character to another is optimised to the length of the 'jump', the weight/inertia of the mask and the characteristics of the motor 28. Table 1 below indicates the pulse profiles for three character jumps, corresponding to a minimal jump (just one character), 72° (ten characters) and 180° (twenty-five characters), and FIG. 4 illustrates the acceleration/sustain/deceleration profile.

|  |  | Duration of Phase |  |
|---|---|---|---|
| 1 Character Jump |  |  |  |
| Start Speed (Step Per Second) | 700 | 1 Step | Accel |
| Sustain Speed (Steps per Second) | 700 | 0 Steps | Sustain |
| Stop Speed (Step Per Second) | 700 | 1 Step | Decel |
| 10 Character Jump |  |  |  |
| Start Speed (Steps Per Second) | 700 | 9 Steps | Accel |
| Sustain Speed (Step Per Second) | 1500 | 2 Steps | Sustain |
| Stop Speed (Steps Per Second) | 700 | 5 Steps | Decel |
| 25 Character Jump |  |  |  |
| Start Speed (Steps Per Second) | 775 | 24 Steps | Accel |
| Sustain Speed (Steps Per Second) | 3400 | 2 Steps | Sustain |
| Stop Speed (Step Per Second) | 775 | 24 Steps | Decel |

These values are scored in a look-up table and, in operation, the computer 24 determines the jumps necessary between successive characters and retrieves the relevant profile from the look-up table and supplies the relevant profile to the stepper motor so that the new mask aperture is aligned and ready when the laser next fires.

In this particular example the stainless steel mask 26 (67 mm diameter) is constructed from 0.08 mm thick material and all unnecessary mass is removed from the mask. The mask has only one set of characters and variations in marked character size and orientation are achieved optically. The character size is adjusted by changing the imaging lens focal length (L1 or L2) by means of a drive 34. Dove prisms (P1 and P2) are used to alter the orientation (vertical or horizontal) of the characters on the wire, by means of a drive 36.

Most of the wires required to be marked in the industry range in size from 0.75 mm to 6.35 mm in diameter. In order to easily read the identification marks with the unaided eye, small characters are marked vertically on the narrower wires. As the wires increase in diameter, a larger font is marked horizontally which can be read in the more normal left to right mode (see FIG. 3).

When a dove prism is rotated about its optical axis, the image of an object viewed through the prism will be seen to rotate at twice the angular rate of the prism. This principle has been adapted to create the horizontal and vertical orientations of the marked characters. One prism is set at 45° in order to rotate the image of the mask characters through 90°, the other is set in the more normal horizontal position to rotate the images through 180°. This is necessary in this example because of the fixed orientation of the mask characters and the number of reflecting surfaces in the optical system.

Owing to the fixed repetition rate of the laser and the need for a uniform space between characters, the wire must be driven at a constant speed during marking, but the wire speed is increased between identification marks by suitable control of the tractor drive 16.

Figure 5:
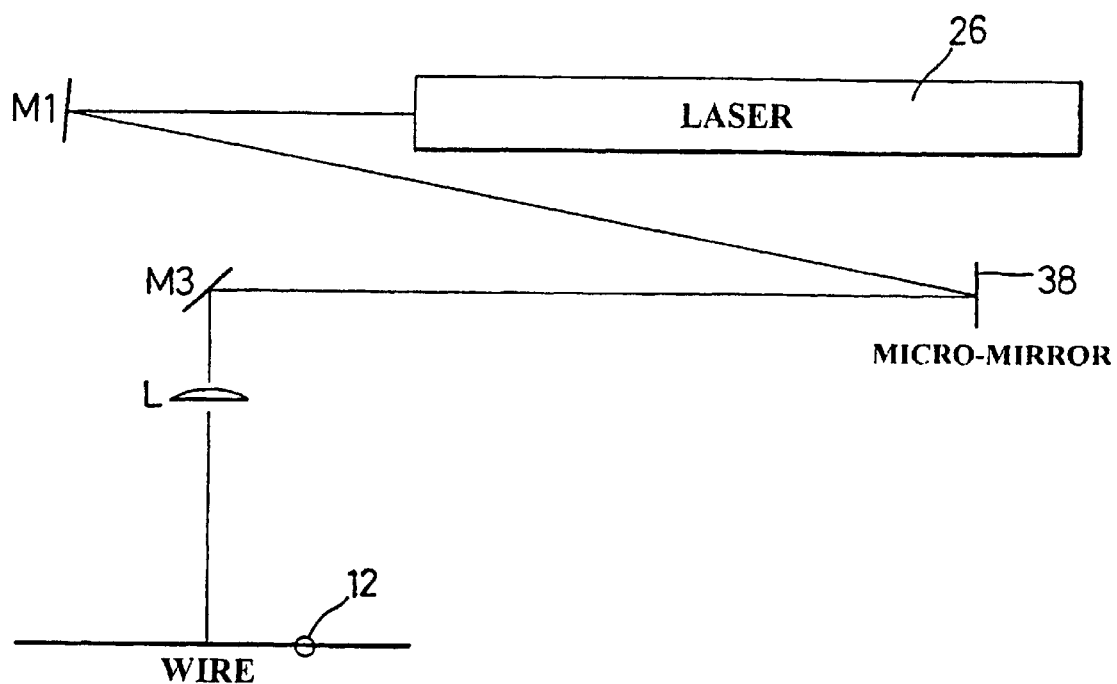
FIG. 5 is a schematic diagram showing the optical configuration of a second embodiment of laser marking system.

The configuration of the marking system of the second embodiment is shown in FIG. 5. In this embodiment the mask assembly, prisms and one of the lenses have been removed. The second turning mirror M2 has been replaced by a high resolution digital display (DMD) 38 as previously described above. Light modulated by the DMD 38 is reflected via a turning mirror M3 through a fixed focal length lens L onto the wire 12. This gives the advantage of fast response, a wide range of character fonts and a reduced number of optical components. The DMD 30 is a pixellated structure with typically 500,000 individually addressable pixels each of which may be switched between an "ON" condition in which it reflects the laser radiation via mirror M3 and lens L along the optical axis shown, and an "OFF" condition in which it reflects the laser radiation off axis to a suitable absorber (not shown). In this way a high resolution image, of alphanumeric or bar code form may be written on a wire.

What is claimed is:

1. Laser marking apparatus for marking a succession of characters on a workpiece (12) to form a composite image thereon comprising:

a generally constant pulsed source (26) of laser radiation for producing a series of laser pulses at a rate of at least 15 Hz, defining a pulsed beam of radiation, a rotatable mask (30) for being illuminated by said radiation beam and including a plurality of character apertures spaced angularly around the axis of rotation thereof;

drive means (32) for rotating said rotatable mask (30), and control means (24) for controlling said drive means (32) intermittently to index said rotatable mask (30) after each of said laser pulses to align a successive character aperture with said laser beam, thereby to produce a succession of characters on said workpiece (12) to form said composite image.

2. Laser marking apparatus according to claim 1, wherein said control means (24) is operable in use to control said drive means (32) to maintain said mask (30) substantially stationary for the duration of the laser pulse.

3. Apparatus according to claim 1, wherein said laser source (26) is a solid state laser.

4. Apparatus according to claim 3, wherein said laser (26) is a Nd:YAG solid state laser.

5. Apparatus according to claim 1, wherein said laser source (26) includes one or more frequency multiplying means.

6. Apparatus according to claim 1, wherein the laser source (26) provides an output beam in the U.V. waveband 200 nm to 400 nm.

7. Apparatus according to claim 1, wherein said laser beam has a marking fluence of between about 50 $mJcm^{-2}$ and about 2000 $mJcm^{-2}$.

8. Apparatus according to claim 1, wherein the drive means (32) comprises a stepper motor and said control means (24) provides a selected drive input profile to said stepper motor to move the mask (30) between successive angular positions.

9. Apparatus according to claim 8, including means (24) for storing, for each of a plurality of increments of angular movement of said mask (30) to align successive character apertures in the laser beam, a respective drive profile.

10. Apparatus according to claim 9, wherein said profile comprises a substantially linear acceleration phase, an optional substantially steady speed sustain phase, and a substantially linear deceleration phase.

11. Apparatus according to claim 1, wherein the mask (30) comprises a plurality of character apertures making up a single character set.

12. Apparatus according to claim 1, wherein the mask (30) is made of thin stainless steel.

13. Apparatus according to claim 1, including optical transformation means ($L_1$, $L_2$) in the beam path beyond the mask (30), operable to adjust at least one of the size and orientation of a character at the marking plane.

14. Apparatus according to claim 13, wherein the optical transformation means (L, $L_2$) includes at least one lens means for being moved into the beam to adjust the size of the image.

15. Apparatus according to claim 13, which includes mapping means (P $P_2$), for being moved into the beam to present the character in a vertical, horizontal or other orientation.

16. Apparatus according to claim 15, wherein said mapping means comprises two dove prisms (P $P_2$) for presenting the characters in the vertical and the horizontal orientation respectively.

17. Apparatus according to claim 1, including means (16) for advancing the workpiece to be marked through the apparatus, said means for advancing being controllable to increase the workpiece speed between identification marks.

18. A laser marking method which comprises marking a succession of characters on a workpiece (12) to form a composite image thereon, said method comprising generating a pulsed beam of laser radiation at a generally constant pulse rate of at least 15 Hz to pass to a rotatable mask (30) carrying a set of mask character apertures thereon, indexing the mask (30) discretely after each of said laser pulses to align a successive character aperture with said laser beam, thereby to produce a composite image comprising a succession of characters on said workpiece (12).

* * * * *

(12) REEXAMINATION CERTIFICATE (4620th)
United States Patent
Moss et al.

(10) Number: US 6,144,011 C1
(45) Certificate Issued: Jul. 23, 2002

(54) LASER MARKING APPARATUS AND METHODS

(75) Inventors: John Moss, Vale of Glamorgan; Simon Lau, Porthcawl; David Keston Phillips, Swansea, all of (GB)

(73) Assignee: Spectrum Technologies Limited, Bridgend (GB)

Reexamination Request:
No. 90/005,917, Jan. 29, 2001

Reexamination Certificate for:
Patent No.: 6,144,011
Issued: Nov. 7, 2000
Appl. No.: 09/125,689
Filed: Aug. 24, 1998

(22) PCT Filed: Feb. 24, 1997

(86) PCT No.: PCT/GB97/00497
§ 371 (c)(1),
(2), (4) Date: Aug. 24, 1998

(87) PCT Pub. No.: WO97/31324
PCT Pub. Date: Aug. 28, 1997

(30) Foreign Application Priority Data
Feb. 23, 1996 (GB) .............................................. 9603868

(51) Int. Cl.[7] .............................................. B23K 26/36
(52) U.S. Cl. .............................. 219/121.68; 219/121.69
(58) Field of Search ....................... 219/121.68, 121.69, 219/121.73, 121.75; 347/224, 247, 258

(56) References Cited

U.S. PATENT DOCUMENTS

| 3,854,808 A | 12/1974 | Germer |
| 4,194,814 A | 3/1980 | Fischer et al. |
| 4,401,992 A | 8/1983 | Vorst et al. |
| 4,477,182 A | 10/1984 | Takanashi et al. |
| 4,578,329 A | 3/1986 | Holsappel |
| 4,626,656 A | 12/1986 | Ootsuka et al. |
| 4,758,848 A | 7/1988 | Nakano |
| 4,803,336 A | 2/1989 | Myer |
| 5,149,938 A | 9/1992 | Winston et al. |
| 5,208,818 A | 5/1993 | Gelbart et al. |
| 5,231,263 A | 7/1993 | Kuwabara et al. |
| 5,719,372 A | 2/1998 | Togari et al. |
| 5,928,842 A | 7/1999 | Shinmoto et al. |

FOREIGN PATENT DOCUMENTS

| DE | 3 703 809 | 8/1988 |
| EP | 0 171 219 | 2/1986 |
| EP | 0 246 801 | 11/1987 |
| EP | 0 354 362 | 2/1990 |
| EP | 0 556 591 | 8/1993 |
| EP | 0 635 799 | 1/1995 |
| GB | 2 098 133 | 11/1982 |
| GB | 2 197 500 | 5/1988 |
| GB | 2 218 219 | 11/1989 |
| JP | 60-121091 | 6/1985 |
| JP | 134724 | 6/1986 |
| JP | 64-15298 | 1/1989 |
| JP | 2-11283 | 1/1990 |
| JP | 4-200886 | 7/1992 |
| JP | 8-1366 | 1/1996 |

OTHER PUBLICATIONS

International Search Report, PCT/GB97/00497.
European Search Report, EP 87 30 4224.

Primary Examiner—Samuel M. Heinrich

(57) ABSTRACT

A method and apparatus for laser marking a moving workpiece such as a wire or cable directs a substantially constant rapidly pulsed laser beam at a frequency of at least 15Hz towards a low inertia, low mass rotatable mask with character apertures disposed around its periphery. The mask is driven asynchronously to present successive characters with each pulse to form a composite image.

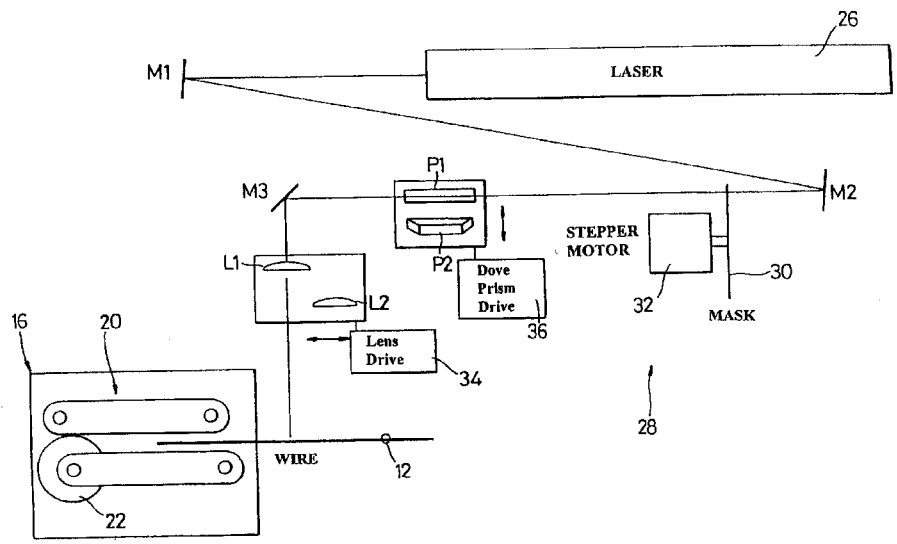

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

* * * * *